United States Patent [19]

Freeman et al.

[11] Patent Number: 5,253,096
[45] Date of Patent: Oct. 12, 1993

[54] DIGITAL PULSE OPTICAL TRANSMITTER AND RECEIVER FOR LOCAL AREA NETWORK APPLICATIONS

[75] Inventors: William R. Freeman, Richmond; Bhavesh Patel, Fremont, both of Calif.

[73] Assignee: Raylan Corporation, Palo Alto, Calif.

[21] Appl. No.: 788,848

[22] Filed: Nov. 7, 1991

[51] Int. Cl.$^5$ .................. H04B 10/00; H04B 10/04
[52] U.S. Cl. .................. 359/184; 359/154; 359/181; 307/268; 375/60; 358/186
[58] Field of Search .......... 359/184, 180, 181, 185, 359/186, 188, 140, 154; 375/59, 60, 68; 307/267, 268, 311; 340/511, 512, 513, 566; 358/186

[56] References Cited

U.S. PATENT DOCUMENTS

| | | | |
|---|---|---|---|
| 3,614,447 | 10/1971 | Paoli et al. | 359/184 |
| 4,759,080 | 7/1988 | Emura et al. | 359/184 |
| 4,850,046 | 7/1989 | Philippe | 359/184 |

Primary Examiner—Richard E. Chilcot, Jr.
Assistant Examiner—Kinfe-Michael Negash
Attorney, Agent, or Firm—Burns, Doane, Swecker & Mathis

[57] ABSTRACT

An optical transmitter and receiver for use in a fiber optic LAN and characterized by reduced pulse-width distortion, low noise, simplicity of design, and advantageous use of widely-available low-cost components. Pulse-width distortion of an optical transmitter is reduced using a pulse input and conditioning circuit that maintains the optical source in an ON state when the injected pulse energy subsides for a time closely approximating the source's turn-on delay. A pre-amplifier portion of an optical receiver is of the transimpedance type, having a low-noise first stage and a moderate-gain second stage connected to the first stage by a feedback resistance on the order of a few kilo-ohms. The low impedance of the feedback resistor minimizes thermal noise, whereas the moderate gain of the second stage still allows a high transimpedance to be achieved. A simple, single-transistor LO-LITE circuit is also disclosed.

5 Claims, 7 Drawing Sheets

DIGITAL PULSE OPTICAL TRANSMITTER AND RECEIVER FOR LOCAL AREA NETWORK APPLICATIONS

BACKGROUND OF THE INVENTION

Field of the Invention

The present invention relates to optical transmitters and receivers for use in fiber optic local area networks.

State of the art

Figure 1A:
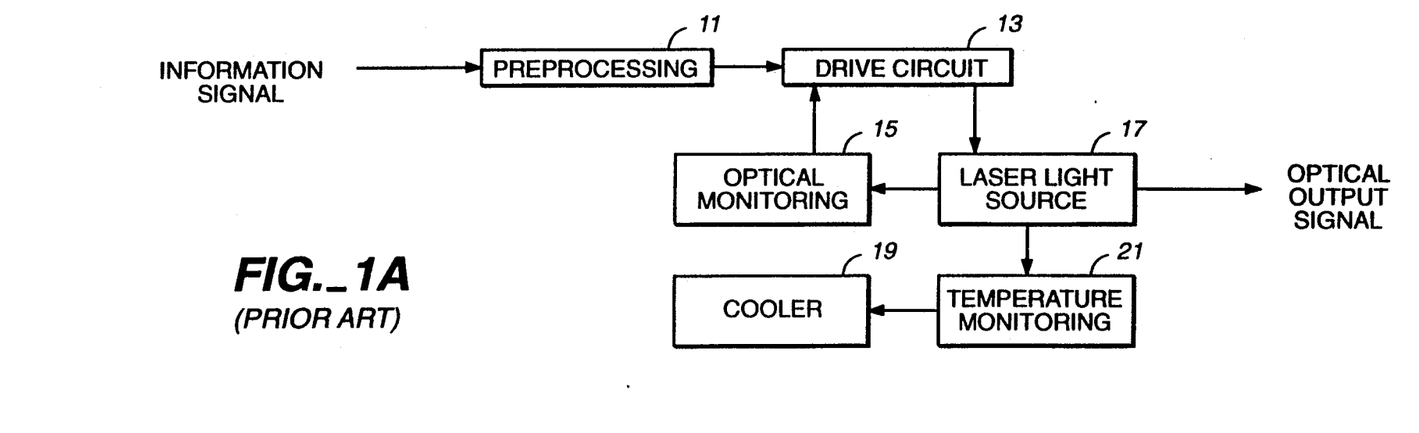
FIG. 1a is a functional block diagram of an optical transmitter according to the prior art.

Conventionally, local area networks (LANs) have been wire connected using, for example, coaxial cable. Fiber optics technology, although well known, has not been widely applied in local area networks. FIG. 1a shows, however, the functional block diagram of a transmitter system according to the prior art for transmitting an optical information signal.

In the transmitter system of FIG. 1a, an electrical information signal is processed by pre-processing circuitry 11 before being provided to a drive circuit 13. The drive circuit 13 drives a laser light source 17 that produces an optical output signal. In practice, it is normal to monitor both the temperature and the output light intensity of the laser light source 17. The monitoring is accomplished in the illustrated system by temperature monitoring circuitry 21 and optical monitoring circuitry 15, respectively. The temperature monitoring circuitry 21 is used to control a cooling mechanism 19 that prevents overheating of the laser light source 17.

As further shown in FIG. 1a, the optical monitoring circuitry 15 produces a control input to the drive circuit 13 to control the energy with which the laser light source 17 is driven. The light signal produced by the laser light source 17 normally is transmitted through a light guide or optical fiber, at the receiving end of which the light signal is received by a receiver system such as the digital optical receiver shown in FIG. 1b.

Figure 1B:
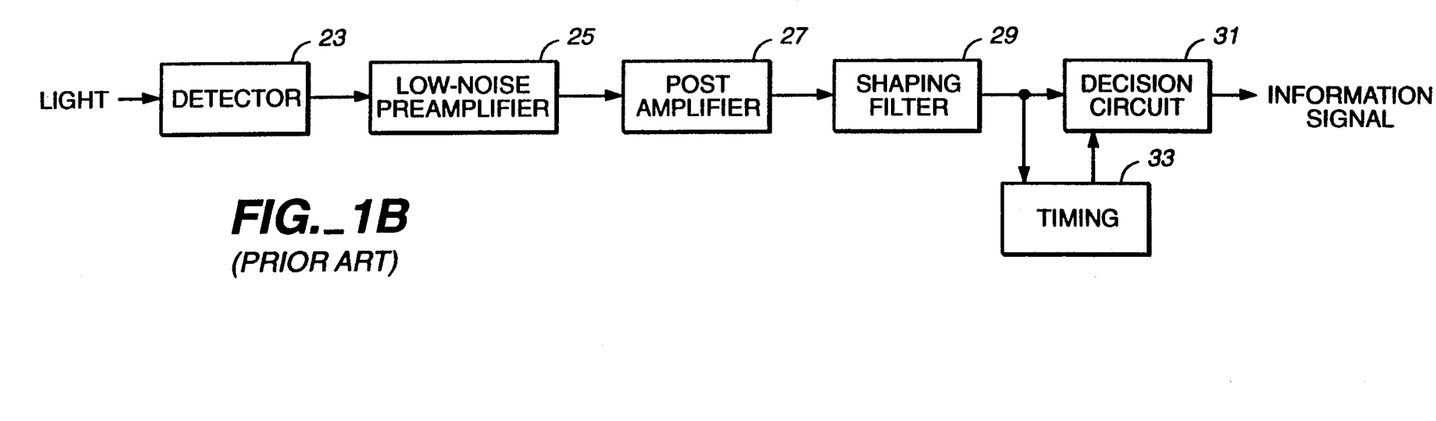
FIG. 1b is a functional block diagram of an optical receiver according to the prior art.

In the receiver system in FIG. 1b, incoming light is detected by a detector 23 to produce a low-level electrical signal. The detector output is amplified by a low-noise pre-amplifier 25. Further amplification is performed in a post-amplifier 27, the output of which is shaped by a shaping filter 29 to produce a final signal. The transmitted digital information is extracted from the final signal by a timing circuit 33 and a decision circuit 31 to replicate the original information signal. It may be noted that FIG. 1b does not show a LO-LITE circuit for determining if the received light signal is too weak to be properly received.

Figure 6:
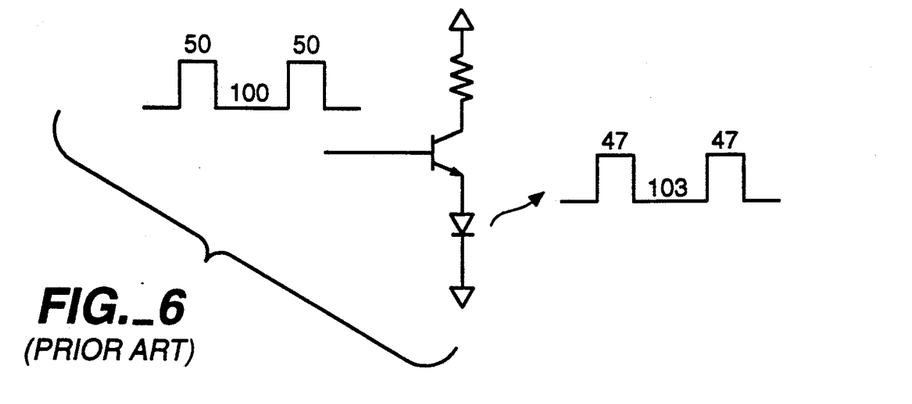
FIG. 6 is a diagrammatic illustration of the problem of pulse-width distortion in the prior art.

A particular problem encountered in optical transmitters of the prior art has been pulse width distortion by the inequality of a non-negligible turn-on delay of the typical optical light source and an essentially negligible turn-off delay. The turn-on delay may be, for example, three nanoseconds and the turn-off delay may be a small fraction of a nanosecond. If the optical light source is driven by a pulse train comprised of pulses 50 ns wide, then the first 3 ns of each pulse will be spent turning on the optical light source such that the leading edge of each pulse of the resulting optical pulse train is delayed by 3 ns. This problem is illustrated in FIG. 6 where, instead of two pulses of 50 ns separated by an interval of 100 ns, the circuit produces an optical pulse train of two 47 ns pulses separated by an interval of 103 ns. In this example, the pulse width distortion is 6%, an unacceptable figure in many applications.

SUMMARY OF THE INVENTION

The present invention provides an optical transmitter and receiver for use in a fiber optic LAN which is characterized by reduced pulse-width distortion, low noise, simplicity of design, and advantageous use of widely-available low-cost components. In one embodiment of the present invention, pulse-width distortion of an optical transmitter is reduced using a pulse input and conditioning means that quickly passes a portion of the injected pulse energy injected to minimize the turn-on delay of an associated optical source, at the same time storing a portion of the pulse energy for release when the injected pulse energy subsides so as to maintain the optical source in an ON state for a time closely approximating the source's turn-on delay. According to another feature of the present invention, a pre-amplifier portion of an optical receiver is of the trans-impedance type, having a low-noise first stage and a moderate-gain second stage connected to the first stage by feedback means including a resistance on the order of a few kilo-ohms. The low impedance of the feedback means minimizes thermal noise, whereas the moderate gain of the second stage still allows a high trans-impedance to be achieved. According to a further feature of the present invention, a wide bandwidth LO-LITE circuit consists essentially of a DC-blocking capacitor, a single transistor with associated biasing network, an RC compensation network to compensate for frequency-gain characteristics of an amplifier preceding the LO-LITE circuit, an integrator, and a comparator.

In practice, the present invention provides an optical transmitter having reduced pulse width distortion. The present invention also provides an optical receiver with a low-noise pre-amplifier.

BRIEF DESCRIPTION OF THE DRAWINGS

The present invention can be further understood with reference to the following description in conjunction with the appended drawings, wherein like elements are provided with the same reference numerals. In the drawings:

FIG. 3 is an enlarged view of the optical transmitter of FIG. 2a;

Figure 3:
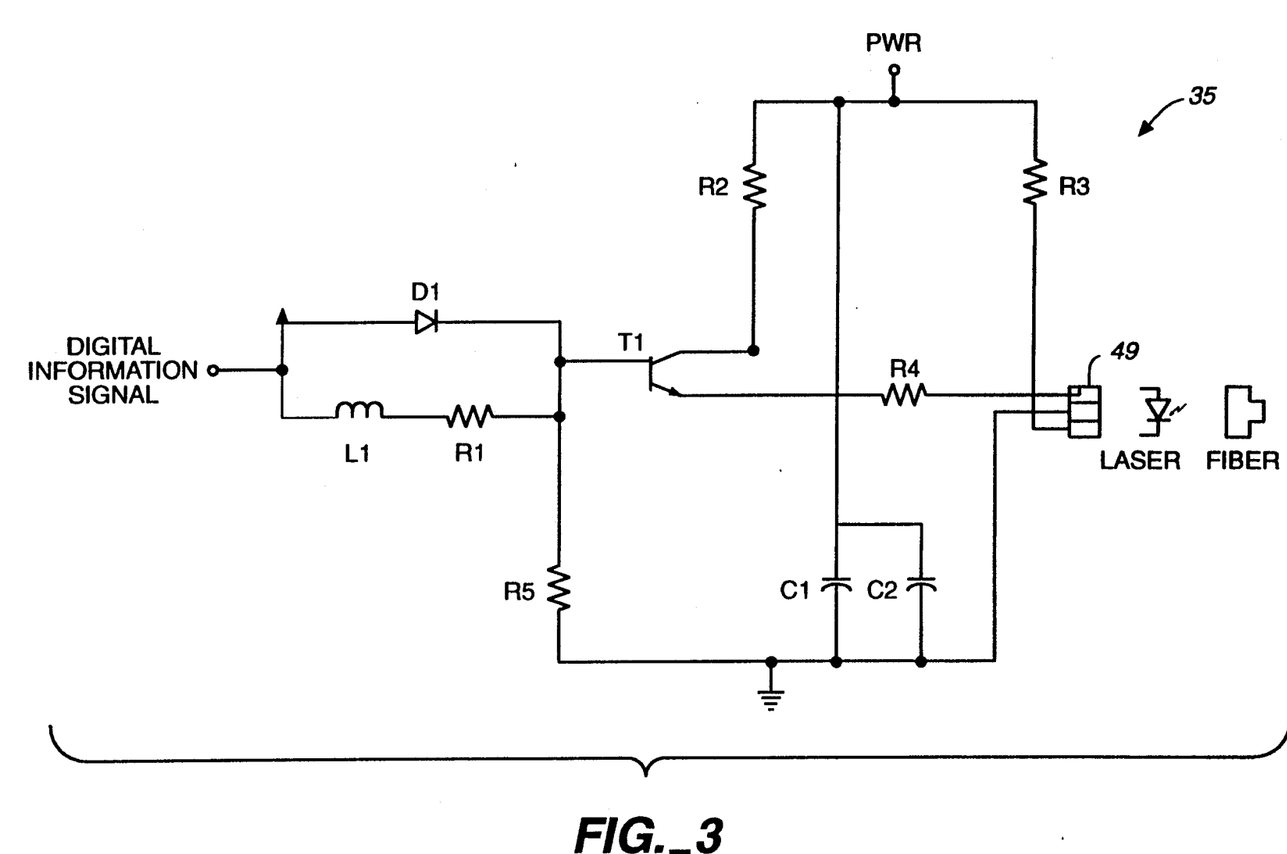
Figure 4:
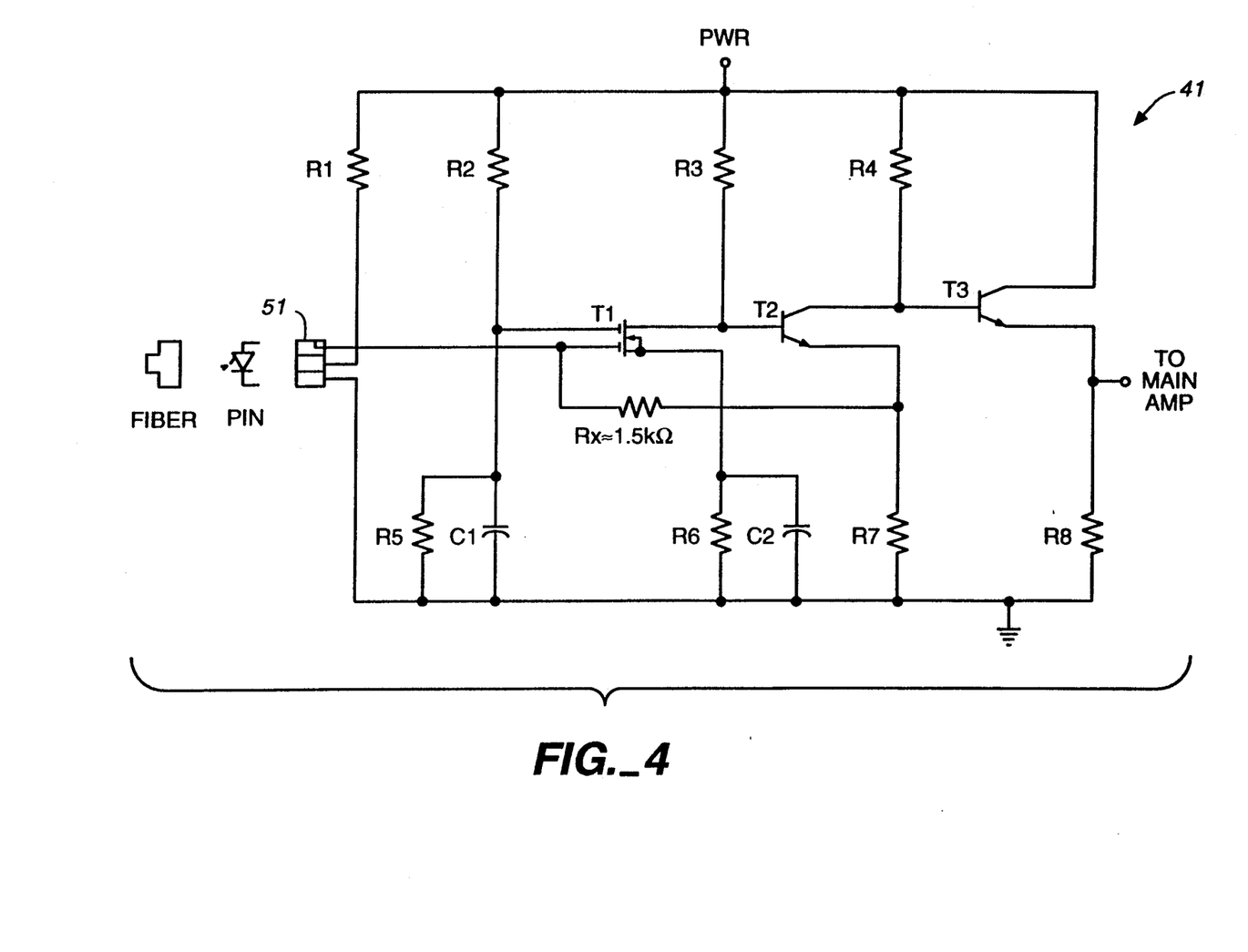
FIG. 4 is an enlarged view of the pre-amplifier portion of the optical receiver of FIG. 2b.
Figure 5:
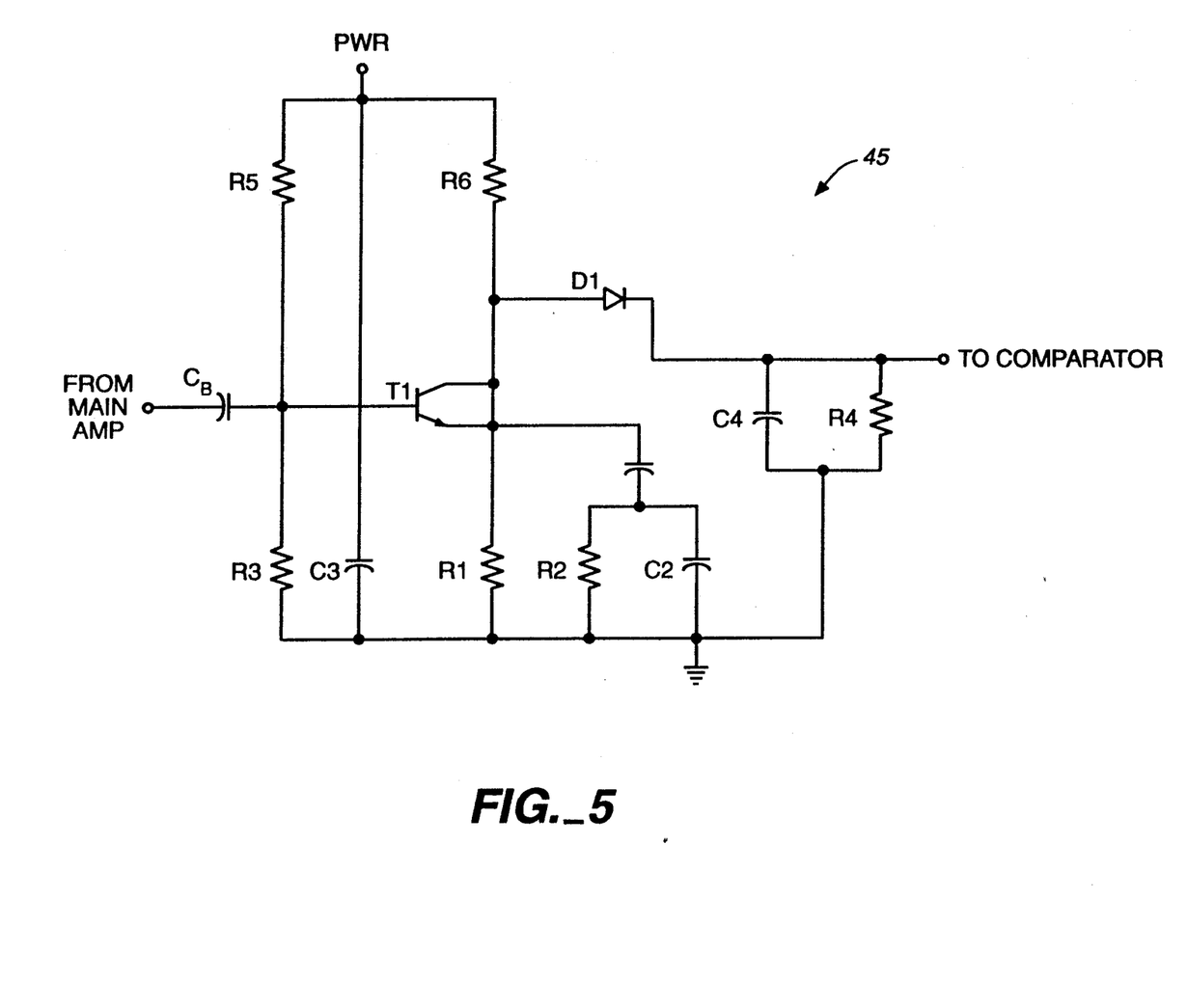
FIG. 5 is an enlarged view of part of a LO-LITE circuit portion of FIG. 2b.

In the description that follows, reference designations R, L, C, and so forth are used to designate resistors, inductors, capacitors and other electronic components in conventional fashion are followed by a subscript notation indicating in which of FIGS. 3–5 that component appears. For simplicity, this convention is not observed in FIGS. 3–5 themselves.

DETAILED DESCRIPTION OF THE PREFERRED EMBODIMENTS

Figure 2A:
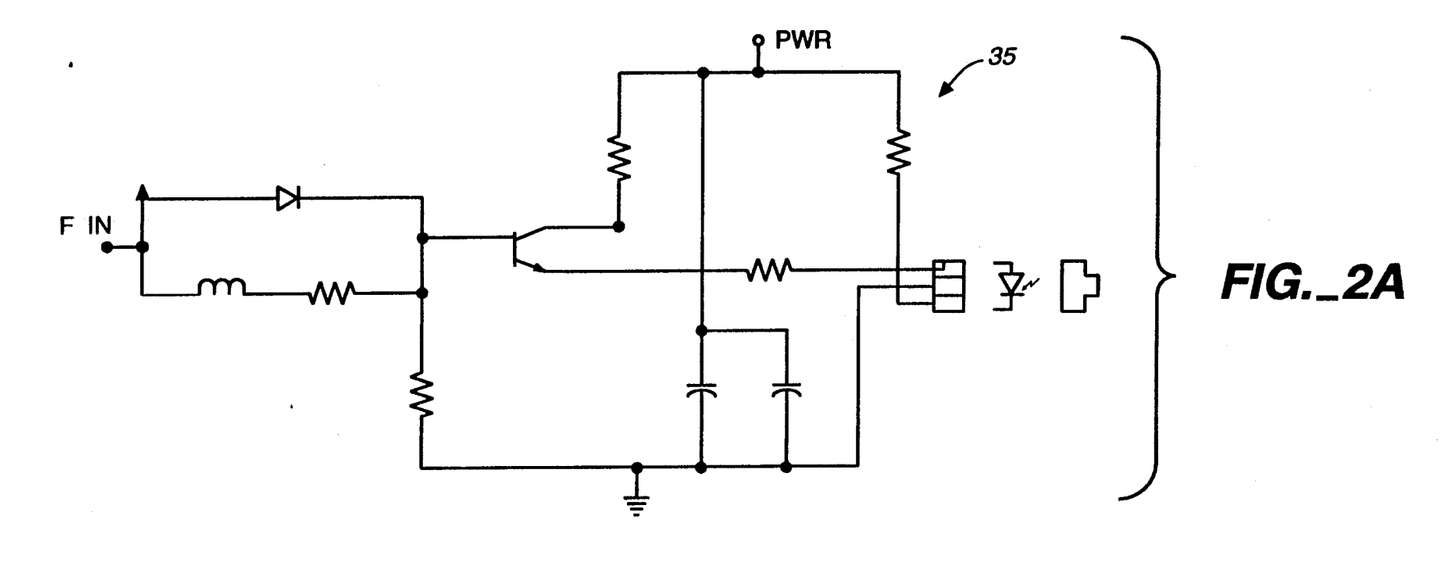
FIG. 2a is a schematic diagram of an optical transmitter according to the present invention.
Figure 2B:
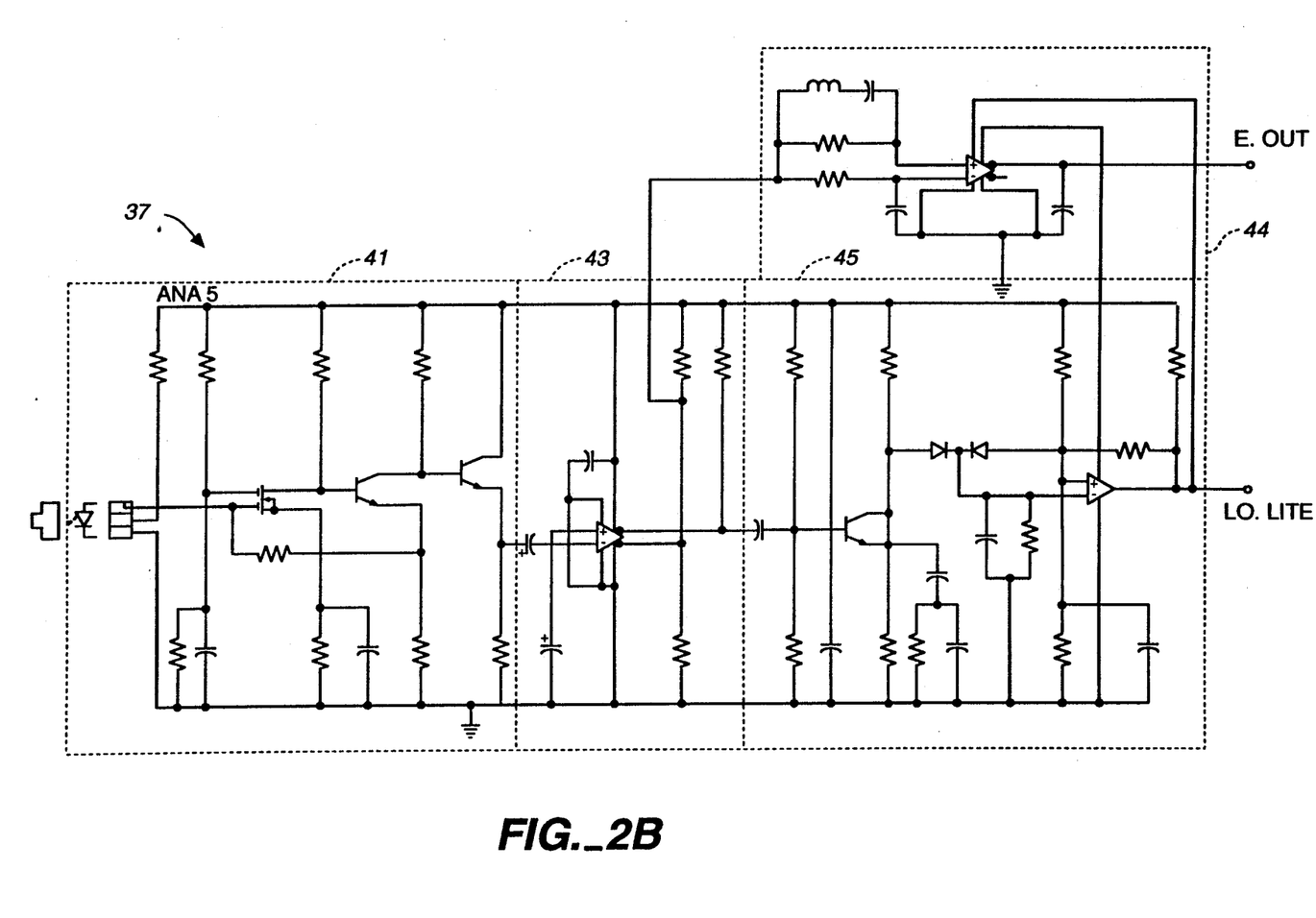
FIG. 2b is a schematic diagram of an optical receiver according to the present invention.
Figure 2C:
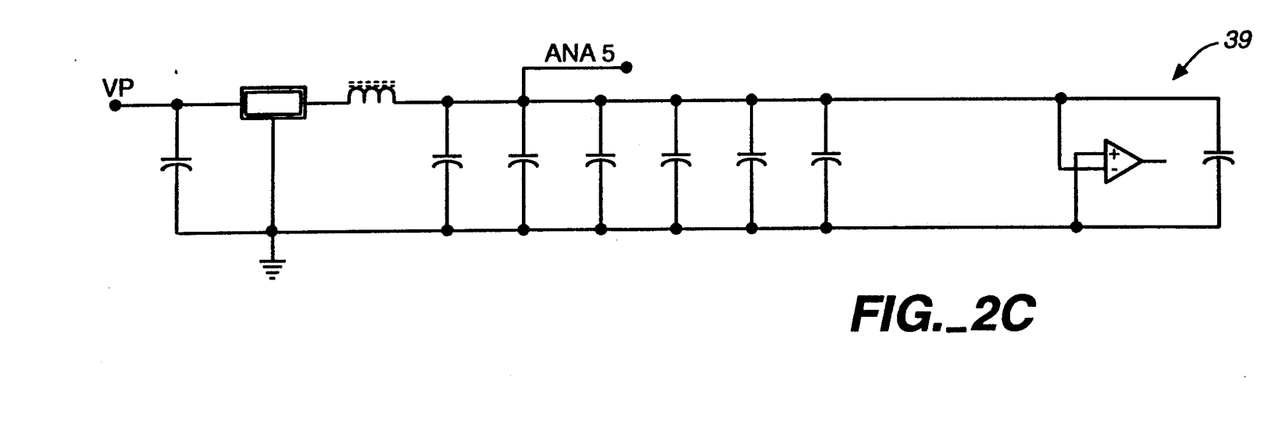
FIG. 2c is a schematic diagram of a power supply network for the optical receiver of FIG. 2b according to the present invention.

In FIG. 2b, the first portion of an optical receiver circuitry comprises a low-noise pre-amplifier 41 and a second portion of the optical receiver circuitry comprises a main amplifier 43. The main amplifier 43 provides complementary outputs, respectively, to a signal-shaping filter 44 to produce a final electrical signal E_OUT and to a LO-LITE circuit to produce a LO-LITE output. The pre-amplifier 41 and the LO-LITE circuit 45 will be described in greater detail in connection with FIGS. 4 and 5 hereafter.

In the optical transmitter in FIG. 3, a laser semiconductor diode is optically coupled to the end of an optical fiber and is electrically coupled by a three terminal connection 49 to the optical transmitter circuitry. The laser is driven through a current-limiting resistor $R4_{(3)}$ by a transistor $T1_{(3)}$ supplied with power through a resistor $R2_{(3)}$. Power is also supplied through a resistor $R3_{(3)}$ to reverse bias a back facet monitor (commonly a photodiode) of the semiconductor laser which may be used to perform the optical monitoring function of block 15 of FIG. 1a. In the present embodiment, however, the monitoring output otherwise available at the laser side of resistor $R3_{(3)}$ is not used. Capacitors C1 and C2 minimize ripple in the power supply voltage.

It should be especially noted that the optical transmitter of FIG. 3 includes a pulse conditioning network for driving the transistor $T1_{(3)}$. In the illustrated embodiment, the optical transmitter includes an inductor $L1_{(3)}$, a resistor $R1_{(3)}$ and a diode $D1_{(3)}$. When an information pulse signal is first supplied to the pulse conditioning network, a rush of current flows through the diode $D1_{(3)}$ to quickly turn on the transistor $T1_{(3)}$ and activate the laser diode. As the pulse continues, a portion of the energy of the pulse determined by resistors $R1_{(3)}$ and $R5_{(3)}$ is stored in the inductor $L1_{(3)}$. When the pulse subsides, the pulse energy stored in the electromagnetic field of the inductor $L1_{(3)}$ is released in an effort to maintain the current through the inductor. This current flows into the base of the transistor $T1_{(3)}$ so as to prolong activation of the laser for a time approximately equal to the turn-on time of the laser. In this manner, the above-described pulse-width distortion problem is substantially avoided.

The detector and pre-amplifier portions of the optical receiver of the present invention function to detect a series of light pulses as produced, for example, by the optical transmitter of FIG. 3, convert those pulses into a low-level electrical signal and amplify the low-level electrical signal into an intermediate level electrical signal in as noise-free a manner as possible. A PIN photo diode is used as the detector element, and is optically coupled to an optical fiber and electrically coupled to a three-terminal connector 51. The PIN photo diode is reversed biased by a resistor $R1_{(4)}$ connected to power. The detection output of the PIN photo diode is input to one of the gates of a dual-gate MOSFET $T1_{(4)}$ used to realize the first stage of the pre-amplifier. A MOSFET is chosen because of its characteristically low noise. A dual-gate MOSFET in particular is chosen so that the amplification of the first stage may be controlled using the second gate. In the present invention, the second gate is set to a potential of about 4 V by means of the resistive divider network $R2_{(4)}$ and $R5_{(4)}$ and the stabilizing capacitor $C1_{(4)}$. The dual-gate MOSFET is biased by resistors $R3_{(4)}$ and $R6_{(4)}$. The latter resistor is connected in shunt with a capacitor $C2_{(4)}$ whose value may be adjusted to adjust the frequency response of the pre-amplifier.

The output of the first dual-gate MOSFET stage is input to a second stage realized by a conventional bipolar NPN transistor $T2_{(4)}$ biased via resistors $R4_{(4)}$ and $R7_{(4)}$ so as to achieve an amplification of about 6 or 7. A feedback path is provided from the emitter of the transistor $T2_{(4)}$ to the input of the MOSFET via feedback resistor $R_f$. To a reasonable approximation, thermal noise in an electrical component increases linearly as the impedance of that component, as is well-known in the art. Thermal noise is the chief limiting factor of the sensitivity of the optical receiver. In accordance with the present invention, the thermal noise of the pre-amplifier is reduced by using a relatively small feedback resistor $R_f$ (for example of approximately 1.5 kilo-ohms), at the same time biasing the second stage transistor $T2_{(4)}$ so as to achieve a moderate gain of about 6 or 7. As a result, approximately 10 kilo-ohms of transimpedance may be obtained with a feedback resistor of only 1.5 kilo-ohms. The output of the second stage is input to a final buffer stage realized using an NPN transistor $T3_{(4)}$ and associated resistor $R8_{(4)}$. The output of pre-amplifier portion of the optical receiver is taken at the emitter of the transistor $T3_{(4)}$.

Optical LANs are typically provided with a LO-LITE circuit that compares the level of a received light signal to a specified threshold to determine when the light signal is too weak to be properly received. When a LO-LITE condition is detected, the output of the optical receiver (E_OUT in FIG. 2b) is suspended. Referring now to FIG. 5, the LO-LITE circuit of the present invention presents a very simple single-transistor circuit for LAN applications but is designed to cover a broad frequency range of 100 KHz to 16 MHz in cooperation with the pre-amplifier and the main amplifier of the optical receiver. The single transistor is a conventional NPN bipolar transistor $T1_{(5)}$ biased via resistors $R5_{(5)}$, $R6_{(5)}$ and $R3_{(5)}$. A DC blocking capacitor $C_B$ forms the input of the LO-LITE circuit and is connected to the base of the transistor $T1_{(5)}$. Connected to the collector of the transistor $T1_{(5)}$ is a diode $D1_{(5)}$ through which an integrator composed of the shunt combination of a capacitor $C4_{(5)}$ and a resistor $R4_{(5)}$ is charged. The output of the integrator is compared with an appropriate threshold to determine when a LO-LITE condition exists. A stabilizing capacitor $C3_{(5)}$ stabilizes power supply to the LO-LITE circuit.

Figure 7A:
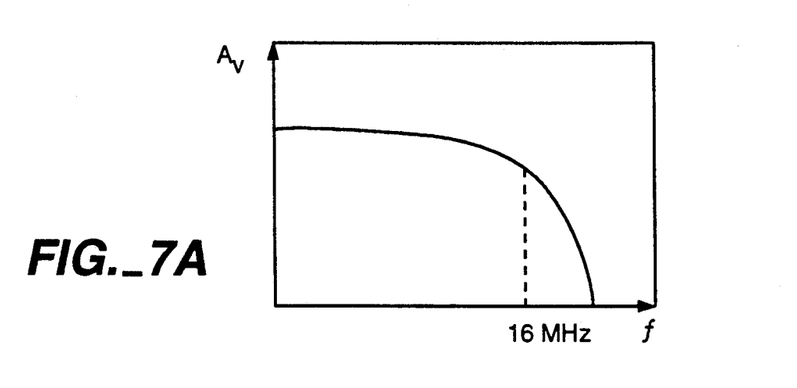
FIG. 7a is an approximate plot of the frequency-gain characteristic of a main amplifier portion of the optical receiver of FIG. 2b.
Figure 7B:
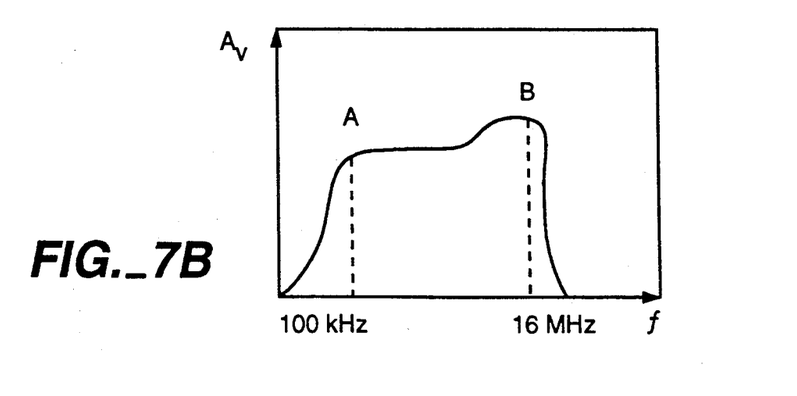
FIG. 7b is an approximate plot of the frequency-gain characteristic of the LO-LITE circuit portion of the optical receiver of FIG. 2b.

Referring to FIG. 7a, the main amplifier of the optical receiver exhibits a frequency-gain characteristic that trails off in the vicinity of 16 MHz. To compensate for this characteristic, the LO-LITE circuit of the present invention is designed to exhibit a frequency-gain characteristic as illustrated in FIG. 7b such that the characteristic exhibits a peak (B) in the vicinity of 16 MHz where the characteristic of the main amplifier trails off. The lower cutoff frequency of the LO-LITE circuit occurs at a knee (A) portion of the characteristic in the vicinity of about 100 KHz.

Referring again to FIG. 5, two RC pairs, R1C1₍₅₎ and R2C2₍₅₎, realize two zeros, one at approximately 100 KHz to yield the knee Ⓐ of the frequency-gain response of FIG. 7a and another at approximately 16 MHz to yield the peak Ⓑ to compensate for gain error caused by the main amplifier. In this manner, a very simple single-transistor LO-LITE circuit is enabled to operate over a relatively wide frequency range.

The features of the present invention described above allow a fiber optic LAN having a favorable cost-performance ratio to be achieved. Using the pre-amplifier design of the present invention with its low noise figure, high receiver sensitivity may be achieved. Using the pulse compensation network of the optical transmitter of the present invention, pulse width distortion may be reduced. Finally, the LO-LITE of the circuit of the present invention provides a very simple and economical circuit that operates over a wide bandwidth.

The present invention, therefore, provides a low-cost, high-performance fiber optic LAN alternative. Still further, the present invention provides an optical receiver having a LO-LITE circuit of single-transistor construction yet operable over a wide frequency range.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. An optical transmitter comprising:
   an input terminal;
   pulse conditioning means DC-coupled to said input terminal for receiving from said input terminal pulse energy of an input pulse to be transmitted, quickly passing a portion of the pulse energy, storing a portion of the pulse energy, and releasing a stored portion of the pulse energy as input pulse energy subsides; and
   optical source means connected to the pulse conditioning means for, after a turn-on delay, beginning to emit light following initiation of said input pulse in response to the portion of the pulse energy that is quickly passed, and for, during a turn-off delay substantially equal to said turn-on delay, continuing to emit light after the subsidence of said input in response to the stored portion of the pulse energy released by the pulse conditioning means, thereby reducing pulse width distortion.

2. The optical transmitter of claim 1 wherein the pulse conditioning means comprises a shunt combination of half-wave rectifying means and electromagnetic storage means.

3. The optical transmitter of claim 2 wherein the electromagnetic energy storage means is an inductor.

4. The optical transmitter of claim 3 wherein the half-wave rectifying means is a diode.

5. The optical transmitter of claim 2 wherein the optical source means is a semiconductor laser diode.

* * * * *